United States Patent
Whitehouse et al.

(10) Patent No.: US 10,240,816 B2
(45) Date of Patent: Mar. 26, 2019

(54) SMART WATER HEATER SYSTEM, METHOD AND COMPUTER READABLE MEDIA

(71) Applicant: UNIVERSITY OF VIRGINIA PATENT FOUNDATION, Charlottesville, VA (US)

(72) Inventors: Cameron Dean Whitehouse, Charlottesville, VA (US); Md Anindya Tahsin Prodhan, Charlottesville, VA (US)

(73) Assignee: University of Virginia Patent Foundation, Charlottesville, VA (US)

(*) Notice: Subject to any disclaimer, the term of this patent is extended or adjusted under 35 U.S.C. 154(b) by 335 days.

(21) Appl. No.: 14/725,453

(22) Filed: May 29, 2015

(65) Prior Publication Data
US 2015/0346740 A1 Dec. 3, 2015

Related U.S. Application Data

(60) Provisional application No. 62/005,108, filed on May 30, 2014.

(51) Int. Cl.
*F24H 9/20* (2006.01)
*F24H 1/18* (2006.01)
(Continued)

(52) U.S. Cl.
CPC ............ *F24H 9/2007* (2013.01); *F24H 1/00* (2013.01); *F24H 1/181* (2013.01); *F24H 1/183* (2013.01);
(Continued)

(58) Field of Classification Search
CPC ..... F24H 1/185; F24H 1/186; G05D 23/1313; G05D 23/13; G05D 23/1306; F24D 2200/04; F24D 2200/08
(Continued)

(56) References Cited

U.S. PATENT DOCUMENTS 3,957,073 A * 5/1976 Barnum ............. G05D 23/1313
 137/100
4,324,207 A * 4/1982 Leuthard ............. F24D 19/1051
 122/14.22

(Continued)

OTHER PUBLICATIONS

A Smarter Water Heater to Cool Down Your Energy Bill—Prodhan et al.(Retrived May 2017).*
(Continued)

*Primary Examiner* — Len Tran
*Assistant Examiner* — Jenna M Hopkins
(74) *Attorney, Agent, or Firm* — Finnegan, Henderson, Farabow, Garrett & Dunner, LLP

(57) ABSTRACT

A smart water heater system (SWHS) for a domestic water system having a plurality of fixtures has a water tank having a cold water inlet and a heat source configured to heat the cold water. The SWHS may also have a mixing valve to blend cold water with the hot water to produce blended water, wherein the blended water is directed to the domestic water system. The SWHS may have a controller in communication with the mixing valve configured to identify which fixture is being used when the domestic water system is drawing water from the water tank, determine an average water temperature utilized by each fixture, and adjust the mixing valve based on which fixture is identified such that a temperature of the blended water is generally equal to the average water temperature for the identified fixture.

19 Claims, 4 Drawing Sheets

(51) Int. Cl.
   F24H 9/12    (2006.01)
   F24H 1/00    (2006.01)
   G05D 23/13   (2006.01)

(52) U.S. Cl.
   CPC ............. *F24H 1/185* (2013.01); *F24H 1/186* (2013.01); *F24H 9/124* (2013.01); *G05D 23/13* (2013.01); *G05D 23/1306* (2013.01); *G05D 23/1313* (2013.01); *F24D 2200/04* (2013.01); *F24D 2200/08* (2013.01)

(58) Field of Classification Search
   USPC ....... 236/12.1, 12.11, 25; 392/445, 450, 454
   See application file for complete search history.

(56) References Cited

U.S. PATENT DOCUMENTS

| | | | | |
|---|---|---|---|---|
| 6,119,947 | A * | 9/2000 | Couture | G05D 23/1366 236/12.11 |
| 8,457,908 | B2 * | 6/2013 | Patel | E03B 7/071 702/189 |
| 8,544,761 | B2 * | 10/2013 | Deivasigamani | G05D 23/1909 137/335 |
| 8,867,908 | B2 * | 10/2014 | Brian | F24H 1/20 219/492 |
| 9,390,381 | B2 * | 7/2016 | Davari | H04L 67/025 |
| 9,513,641 | B1 * | 12/2016 | Haws | G05D 23/1306 |
| 2005/0205680 | A1 * | 9/2005 | Valente | E03C 1/00 236/12.11 |
| 2007/0246550 | A1 * | 10/2007 | Rodenbeck | E03C 1/057 236/12.11 |
| 2008/0216770 | A1 * | 9/2008 | Humphrey | F24H 1/145 122/13.3 |
| 2011/0042468 | A1 * | 2/2011 | Lee | G05D 23/13 236/12.1 |
| 2011/0135289 | A1 * | 6/2011 | Kayser | F24D 17/0031 392/449 |
| 2012/0024968 | A1 * | 2/2012 | Beyerle | G05D 23/1346 236/12.11 |
| 2012/0145936 | A1 * | 6/2012 | Chang | F16K 11/0787 251/281 |
| 2012/0165993 | A1 * | 6/2012 | Whitehouse | G05D 23/1904 700/278 |
| 2012/0192965 | A1 * | 8/2012 | Popper | E03B 7/04 137/357 |
| 2013/0299600 | A1 * | 11/2013 | Beckers | F24H 1/185 237/8 A |
| 2014/0026970 | A1 * | 1/2014 | DuPlessis | G05D 23/132 137/3 |
| 2014/0060457 | A1 * | 3/2014 | Hill | G05D 23/19 122/14.1 |
| 2014/0202549 | A1 * | 7/2014 | Hazzard | F24H 9/2007 137/3 |
| 2014/0203093 | A1 * | 7/2014 | Young | F24D 19/1066 237/8 A |
| 2014/0277817 | A1 * | 9/2014 | Stevens | G05D 23/1917 700/300 |
| 2014/0297048 | A1 * | 10/2014 | Buchheit | H04L 12/2803 700/283 |

OTHER PUBLICATIONS

Hot Water DJ-Saving Energy by Pre-mixing Hot Water—Prodhan et al. (Retrieved May 2017).*
HydroSense Infrastructure-Mediated Single-Point Sensor of Whole-Home Water Activity—Froehlich et al. (Retrieved May 2017).*
Savings Project Lower Water Heating Temperature Department of Energy—Dep. of Energy (Retrieved May 2017).*
NPL Search from STIC (Retrieved May 2017).*
Patent Search from STIC (Retrieved May 2017).*
Temperature—Eric Weisstein's World of Physics (2007).*

* cited by examiner

SMART WATER HEATER SYSTEM, METHOD AND COMPUTER READABLE MEDIA

RELATED APPLICATIONS

This application claims the benefit of U.S. Provisional Application No. 62/005,108, filed May 30, 2014, which is incorporated by reference in its entirety.

TECHNICAL FIELD

The present disclosure relates generally to a smart water heater system, and more particularly, to a smart water heater system for residential use.

BACKGROUND

Many techniques have already been proposed to make water heaters more energy efficient, but these techniques have involved mechanical changes to the water heating and delivery system. Storage water heaters store hot water in insulated tanks until it is needed by a fixture or appliance. Storage systems are the cheapest and therefore the most common system in the US, but they waste energy in several ways that are expensive to mitigate, as found by the Residential End User Water Study (REUWS) (see P. Mayer and W. DeOreo. *Residential end uses of water*. American Water Works Association, 1999.). Stand-by heat loss is heat that leaks from the insulated water tank, and the energy required to replace the lost heat accounts for approximately 11% of the system's total energy usage. Many homeowners wrap their tank in fiberglass insulation, but this will have little effect on modern water tanks that already have good insulation, with thermal resistance up to R-25. Stand-by energy loss can be eliminated by using tankless water heaters that use high-powered burners to quickly heat water on demand only when needed by the occupants, but tankless systems can cost over $1200 installed. Furthermore, tankless systems can be damaged by mineral deposits and recommended to have annual maintenance, which is an additional expense. Because they cost much more than storage water heaters, product analysts estimate that the time required to break even with a typical tankless heater is 22 years, which is longer than the 20-year lifetime of many models (see A. Marks. Are tankless water heaters a worthwhile investment? *Consumer Reports Magazine*, October 2008.). Pipe loss is heat that is lost through the hot water pipes, and accounts for approximately 20% of a storage water heater's total energy usage [3]. Most pipe loss occurs after a hot water fixture is turned off: hot water remains in the pipes and the heat is wasted (see J. Lutz. Estimating energy and water losses in residential hot water distribution systems. 2005.). A typical ¾ inch PEX pipe contains approximately 1 gallon of hot water for every 10 feet of piping. Thus, when a bathroom sink is across the house from the central water heater, 3-4 gallons of hot water may be wasted due to pipe loss when supplying only a ¼ gallon of water to wash hands. Pipe loss affects both storage and tankless water heaters, as well as any system that pipes hot water through the building. Pipe loss causes nearly twice the energy waste as stand-by heat loss because most homes have completely uninsulated pipes, but opening walls and floors to add insulation to the pipes is cost prohibitive. Pipe loss does decrease the space heating bill in the winter, but this benefit is canceled out by an increased air conditioning bill in the summer. Today, the main solution to reduce pipe loss is to move the hot water system closer to the fixture by using a point-of-use (POU) water heater that is installed just below the fixture it serves. However, POU water heaters must be installed at every fixture, and cost nearly as much per unit as a single storage water heater that would serve the whole house: approximately $200 per unit installed. Furthermore, POU water heaters don't have the capacity required for high volume water usage like showers, clothes washers, or dish washers, and must therefore be used in conjunction with a more conventional water heater anyway.

The disclosed system is directed to improving the energy efficiency of water heaters by providing a more efficient and inexpensive smart water heater system and method of operation.

SUMMARY

In one aspect, the present disclosure is directed to a smart water heater system (SWHS) for a domestic water system having a plurality of fixtures. The SWHS may include a water tank having a cold water inlet configured to receive cold water from a cold water supply. The water tank may also include a heat source configured to heat the cold water producing hot water and a hot water outlet configured to discharge the hot water from the water tank. The SWHS may also include a mixing valve configured to blend cold water from the cold water supply with the hot water from the hot water outlet to produce blended water, wherein the blended water is directed to the domestic water system. The SWHS may further include a first flow meter configured to measure a flow rate of the blended water from the mixing valve, a second flow meter configured to measure a flow rate of cold water supplied to the domestic water system, and a pressure sensor configured to measure a pressure of the cold water supplied to the water tank. The SWHS system may also include a controller in communication with the mixing valve, the first flow meter, the second flow meter, and the pressure sensor. The controller may be configured to identify which fixture is being used when the domestic water system is drawing water from the water tank and determine an average water temperature utilized by each fixture. The controller may also be configured to adjust the mixing valve based on which fixture is identified such that a temperature of the blended water is about equal to the average water temperature for the identified fixture.

In another aspect, the present disclosure is directed to a smart water heater kit for a water heater system for a domestic water system having a plurality of fixtures. The smart water heater kit may include a mixing valve configured to blend cold water from the cold water supply with the hot water from the hot water outlet of a water tank to produce blended water, wherein the blended water is directed to the domestic water system. The smart water heater kit may also include a first flow meter configured to measure a flow rate of the blended water from the mixing valve, a second flow meter configured to measure a flow rate of cold water supplied to the domestic water system, and a pressure sensor configured to measure a pressure of the cold water supplied to the water tank. The smart water heater kit may also include a controller in communication with the mixing valve, the first flow meter, the second flow meter, and the pressure sensor. The controller may be configured to identify which fixture is being used when the domestic water system is drawing water from the water tank and determine an average water temperature utilized by each fixture. The controller may also be configured to adjust the mixing valve based on which fixture is identified such that a temperature of the blended water is about equal to the average water temperature for the identified fixture.

In another aspect, the present disclosure is directed to a method of operating a smart water heater system for a domestic water system having a plurality of fixtures. The method may include measuring the pressure of cold water supplied to a hot water tank of the system from a cold water supply during operation and heating the cold water supplied to the hot water tank to produce hot water. The method may further include mixing cold water from the cold water supply with hot water from the hot water tank to produce blended water, wherein the blended water is directed to the domestic water system. The method may also include measuring a flow rate of the blended water supplied to the domestic water system and measuring a flow rate of the cold water supplied to the domestic water system from the cold water supply. The method may further include operating a controller, wherein operating the controller includes identifying which fixture is being used when the domestic water system is drawing water from the hot water tank and determining an average water temperature utilized by each fixture. Operating the controller may also include adjusting the mixing valve based on which fixture is identified such that a temperature of the blended water is about equal to the average water temperature for the identified fixture.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the present disclosure and together with the description, serve to explain the principles of the disclosure.

DETAILED DESCRIPTION

Figure 1:
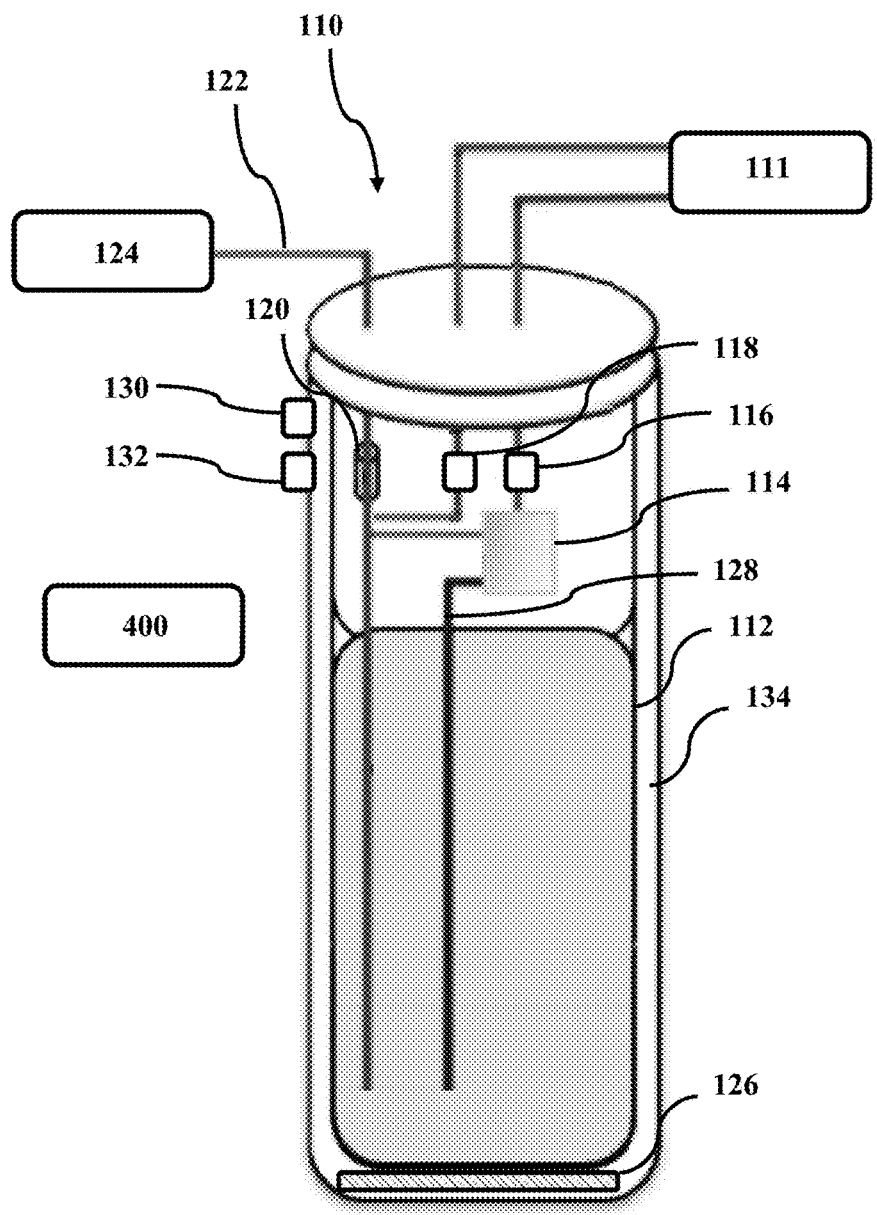
FIG. 1 is a schematic illustration of an exemplary disclosed hot water heater system.

FIG. 1 illustrates an exemplary smart water heater system (SWHS) 110 for a domestic water system 111 (e.g., a residential home, apartment, etc.), according to an exemplary embodiment. SWHS 110 may be configured to supply water (e.g., hot and cold water) to domestic water system 111. SWHS 110 can include a water tank 112, a mixing valve 114, a first flow meter 116, a second flow meter 118, a pressure sensor 120, and a controller 400, for example, as shown in FIG. 1.

Water tank 112 may be any suitable tank capable of storing water. Water tank 112 may have a cold water inlet 122 piped to a cold water supply 124 such that water tank 112 may receive cold water from cold water supply 124. Water tank 112 may also have a heat source 126 configured to heat the cold water supplied to water tank 112, thereby producing hot water. Heat source 126 may be any suitable heat source (e.g., electric immersion heater, electric band heaters, gas furnace heaters, etc.) capable of heating the water contained in water tank 112. Water tank 112 may also have a hot water outlet 128 configured to discharge the hot water from water tank 112.

The hot water discharged from water tank 112 may be directed to mixing valve 114. In addition to the hot water, cold water from cold water supply 124 may also be directed to mixing valve 114, as shown in FIG. 1. Mixing valve 114 may be configured to blend the cold water and the hot water to produce blended water. Mixing valve 114 may be adjustable such that the percentage of the cold water and hot water in the water flow can vary for both from 0% to 100%. Depending on the adjustable position of mixing valve 114, the ratio of cold water to hot water making up the blended water may be, for example, about 0:100, about 5:95, about 10:90, about 20:80, about 30:70, about 40:60, about 50:50, about 60:40, about 70:30, about 80:20, about 90:10, about 95:5, or about 100:0. The blended water discharged from mixing valve 114 may be directed to domestic water system 111. In addition, to blended water, SWHS 110 may also be configured to directly supply cold water from cold water supply 124 to domestic water system 111, as shown in FIG. 1.

First flow meter 116 may be positioned down stream of mixing valve 114 in the blend water line and may be configured to measure a flow rate of the blended water discharged from mixing valve 114. In other words, first flow meter 116 may measure the flow of blended water in the "main line" supplying blended water to the domestic water system. Second flow meter 118 may be positioned in the line supplying cold water to domestic water system 111, for example, as shown in FIG. 1. Second flow meter 118 may be configured to measure a flow rate of cold water supplied to the domestic water system. In other words, second flow meter 118 may measure the flow of cold water in the "main line" supplying cold water to domestic water system 111.

First flow meter 116 and second flow meter 118 may be, for example, ultrasonic water flow meters that use the Doppler effect to measure the velocity of water flowing through the pipe and may be configured such that the flow meters clamp on the outside of the water pipes with no plumbing changes to the pipes being needed. This type of installation simplifies installation of SWHS 110 to existing water heater systems. It is contemplated that other suitable types of flow meters may be utilized including those needing plumbing changes for install.

Pressure sensor 120 may be positioned in cold water inlet 122, for example, as shown in FIG. 1. Pressure sensor 120 may be configured to measure a pressure of the cold water being supplied to water tank 112. Pressure sensor 120 may be any suitable pressure sensor configured to measure water pressure. It is contemplated that the position of pressure sensor 120 may vary so long as the location of pressure sensor 120 measures the change in water pressure caused by the use of a fixture (not shown) of domestic water system 111.

Mixing valve 114, first flow meter 116, second flow meter 118, and pressure sensor 120 may all be in communication with controller 400. For example, controller 400 may be configured to send a signal capable of adjusting the position of mixing valve 114 such that the percentage of hot water and cold water varies between 0% and 100%. Controller 400 may be configured to receive the measured flow rate of the blended water from first flow meter 116 and the measured flow rate of the cold water from second flow meter 118. Controller 400 may be configured to receive the measured pressure of the cold water from pressure sensor 120. The positioning of controller 400 may vary. For example, as shown in FIG. 1, controller 400 may be detached from water tank 112. In some embodiments, controller 400 may be attached or integrated into a housing 134 of SWHS 110.

Controller 400 may be programmed to use water sensing systems like HydroSense (see e.g., J. Froehlich, E. Larson, T. Campbell, C. Haggerty, J. Fogarty, and S. Patel. Hydrosense: infrastructure-mediated single-point sensing of whole-home water activity. *In Proceedings of the 11th international conference on Ubiquitous computing*, pages 235-244. ACM, 2009.), WaterSense (see e.g., V. Srinivasan, J. Stankovic, and K. Whitehouse. Watersense: Water flow disaggregation using motion sensors. In *The 3rd ACM Workshop On Embedded Sensing Systems For Energy-Efficiency In Buildings (BuildSys), in conjunction with ACM SenSys*, 2011.), NAWMS (see e.g., Y. Kim, T. Schmid, Z. Charbiwala, J. Friedman, and M. Srivastava. Nawms: non-intrusive autonomous water monitoring system. *In Proceedings of the 6th ACM conference on Embedded network sensor systems*, pages 309-322. ACM, 2008.), and Fixture-Finder (see e.g., V. Srinivasan, J. Stankovic, and K. Whitehouse. FixtureFinder: Discovering the Existence of Electrical and Water Fixtures. In *The 12th ACM/IEEE Conference on Information Processing in Sensor Networks (IPSN'13)*, 2013.). The original HydroSense paper required supervised learning, but SWHS 110 is configured to solve a simpler problem: it differentiates fixtures, it does not need to recognize fixtures. SWHS 110, by utilizing other unsupervised fixture recognition systems (e.g., WaterSense and Fixture-Finder), may differentiate fixtures. Alternatively, SWHS 110 may be configured to run through a supervised training period during installation in order to differentiate fixtures.

Controller 400 may be configured to use these water sensing systems to identify which fixture of the domestic water system is being used when water is being drawn from water tank 112. Controller 400 may be configured to use these water sensing systems to detect the ratio of hot water and cold water that is being mixed at the fixture. Using these water sensing system, controller 400 may also deduce the water temperature at the fixture from the ratio and it may detect the arrival time of blended water at the fixture by observing if an when the user starts mixing cold water to achieve a desired temperature. Over time, controller 400 may be configured to develop a use profile for each fixture. The use profile for each fixture may include, for example, a typical (e.g., average, target, or optimal) water temperature of the water being used, pipe lag to the fixture, and probability of a short event. A short event is when a user turns on the hot water tap at a fixture only to turn if off again before the hot water from the tank even reaches the fixture. Short events are common, for example, at the bathroom sink when a user may have soap or a toothbrush in the right hand, and use the hot water only because they turn the tap with their left hand. Hot water drawn from the heater for short events may be entirely wasted as pipe loss, and the cold water that enters the tank to replace the discharged hot water must also now be heated. Analysis (see Document A, FIG. 1) has shown that approximately 4% of total water heating energy is wasted due to short events.

Once controller 400 identifies which fixture of the domestic water system is being utilized it can determine or identify the typical water temperature utilized by that fixture based on the use profiles. Controller 400 may then adjust mixing valve 114 such that the temperature of the blended water discharged to the domestic water system is about equal to the typical water temperature for the identified fixture. In other words, SWHS 110 supplies blended water to each fixture at a temperature, which the fixture being utilized typically utilizes, thereby reducing stand-by heat loss and pipe loss. It is to be understood that about equal may mean the difference in temperature of the blended water and the typical water temperature for the identified fixture may be, for example, less than about 1%, about 2%, about 3%, about 4%, about 5%, about 6%, about 7%, about 8%, about 9%, or about 10% of the typical water temperature for the identified fixture.

Exploratory studies were performed in which usage data was collected for multi-person homes for a period of times. The details of these studies can be found in Document A, Document B, and Document C filed with U.S. Provisional Application No. 62/005,108, for which this application claims the benefit of priority and incorporates by reference in its entirety including the references and attachments contained within. As a result of the studies there were three major observations: (1) fixtures in a house typically require water at different temperatures; (2) fixtures in a house have different pipe lag and hot water often never reaches the fixtures; and (3) both the water temperature and pipe lag can be approximated by measuring hot and cold water flow. With respect to observation (3), this may be beneficial because it enables collecting of a complete temperature, flow, and delay profile for each fixture using only single point sensors (e.g., first flow meter 116, second flow meter 118, and pressure sensor 120) integrated with the water heater, instead of requiring sensors to be installed at each fixture.

Similar to convention, hot water heater systems, like SWHS 110, may include a temperature dial that a user may use to control a set-point temperature 130 of the water. It is contemplated that the set-point temperature may also be set by or integrated into controller 400. In addition to setting the set-point temperature, SWHS 110 may also include an energy saver input 132 (e.g., a dial or an input programmable into controller 400) that has a continuum between "conservative" and "aggressive" energy savings. Aggressive energy savings may produce more energy savings but might also have a bigger effect on what may be characterized as "miss time" (i.e., the amount of time that the user wants hot water but does not get it, or gets it at a lower temperature than desired). Miss time is fairly common with all water heaters. For example, people need to wait for hot water to arrive at the fixture (pipe lag), or they have run out of hot water due to overuse (e.g., very long showers). By dialing energy saver input 132 to "aggressive" energy savings, a user may expect their miss time to increase by 25% or less over a conventional water heater. For example, if a user typically needs to wait 20 second for hot water at a certain fixture, they may now need to wait 25 seconds. By dialing the energy saver input to "conservative" energy savings, a user may expect the miss time to remain unchanged. SWHS 110 may be configured such that set-point temperature 130 and energy saver input 132 are the only parameters set during the setup of SWHS 110.

It is contemplated that set-point temperature 130 and energy saver input 132 may have default values eliminating the need for an initial setup. It is also contemplated that set-point temperature dial 130 and energy saver input 132 may be adjusted during operation following the initial setup. For example, if a user decides that the current miss time is not desirable, the user may dial down the aggressiveness of energy saver input 132. In situations where a user may want a temporary override in order to, for example, wash something with very hot water, there are several options for triggering an override. For example, SWHS 110 may include an override button (not shown) on water tank 112 or on controller 400 or a wireless button near the fixture. Another option, for example, may be having the user trigger an override by switching the fixture off and on multiple times in quick succession. When SWHS 110 detects this water flow pattern, it may be configured to temporarily supply that fixture with water at the set-point temperature.

SWHS 110 may be configured after installation to enter an initialization period where it learns the use profile of each fixture, including for example, the fixture's average water temperature, pipe lag, and it probability of experiencing a short event. Following the initialization period, SWHS 110 may select a typical delivery temperature and delivery delay for each fixture. Thereafter, SWHS 110 may pre-mix the hot water with the cold water using mixing valve 114 to produce the blended water at the fixture's typical temperature before supplying it through the domestic water system 111 pipes, instead of requiring the occupant to perform mixing at the fixture. Delivering water to each fixture at the typical temperature of that fixture reduces energy waste by reducing the water temperature in the pipes and tank whenever possible, with little or no impact from the user's point of view. SWHS 110 may also be configured to opt to delay the hot water altogether if controller 400 predicts a short event. Controller 400 may predict a short event by determining a probability of a short event based on use profiles of the fixtures and when the probability is greater than a short event threshold set point, controller 400 may adjust mixing valve 114 so that no hot water is directed to the domestic water system 111. This operation reduces energy waste by releasing less or even no hot water into the pipe during a short event. If the usage patterns for a fixture change substantially, SWHS 110 may be configured to recalculate the delivery temperature and delay.

It is contemplated that SWHS 110 may be incorporated into new storage water heaters or SWHS 110 may be incorporated into already installed storage water heaters as a retrofit by utilizing the existing water tank. In addition, SWHS 110 and the approaches described herein may also be utilized with tankless and POU water heaters as well.

Figure 2:
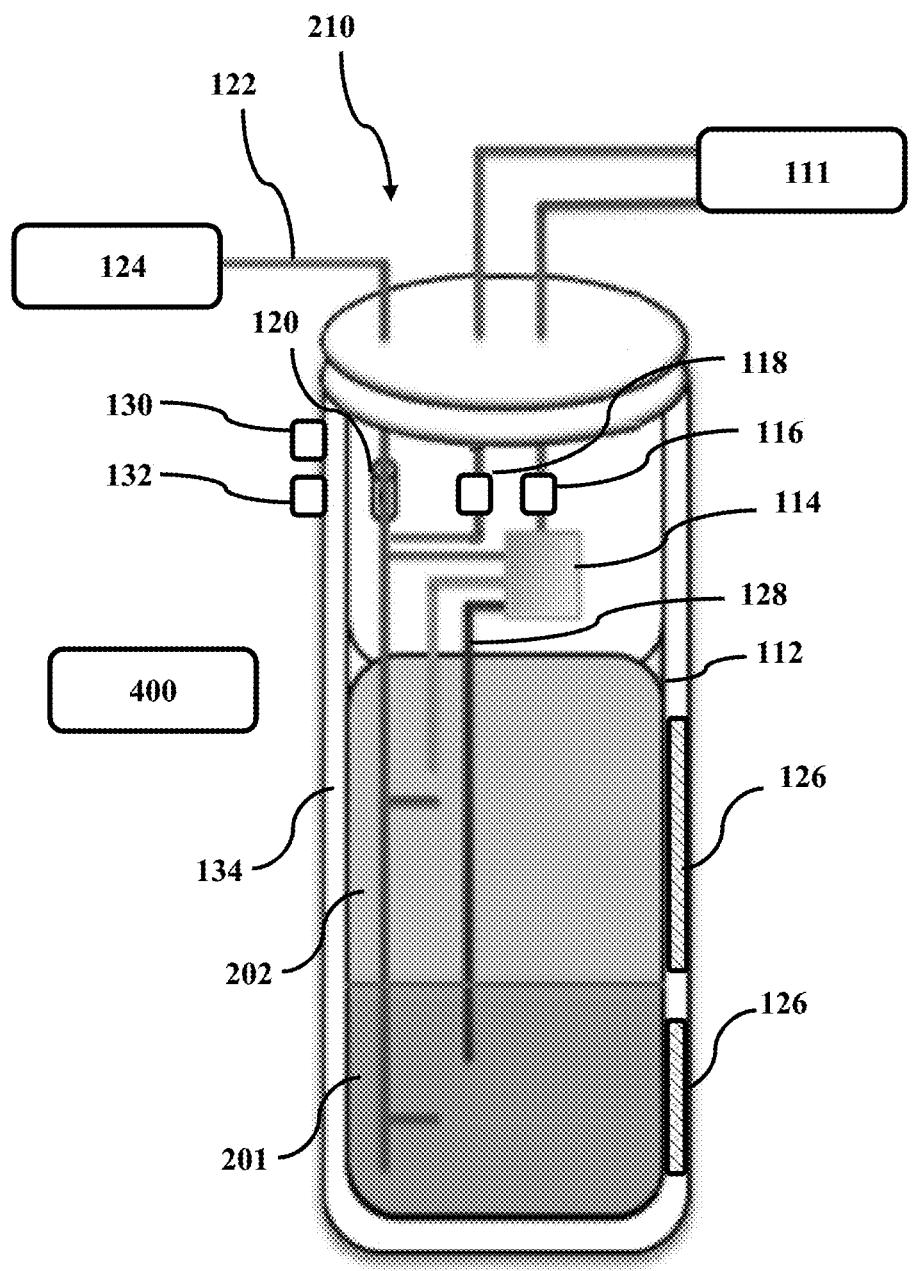
FIG. 2 is a schematic illustration of another exemplary disclosed hot water heater system.

FIG. 2 illustrates a SWHS 210 for domestic water system 111 (e.g., a residential home, apartment, etc.), according to another exemplary embodiment. SWHS 210 may include many of the same features as SWHS 110, but also may include various difference features. For example, water tank 112 may include a first tank 201 and a second tank 202, one or both of which may be smaller than water tank 112. One or both of first tank 201 and second tank 202 may be independently heated such that they may store water at two different temperatures. The arrangement of first tank 201 and second tank 202 may vary. For example, second tank 202 may be positioned on top of first tank 201, as shown in FIG. 2. In other embodiments, for example, first tank 201 and second tank 202 may be positioned adjacent one another or first tank 201 and second tank 202 may be separated from one another. SWHS 210 may be configured such that either first tank 201 or second tank 202 may be a "hot tank" and the other tank may be a "warm tank." For example, "hot tank" may be heated to a hot water temperature set point and "warm tank" may be heated to a warm water temperature set point. The warm water temperature set point may be calculated by controller 400 based on the use profiles for each fixture. The hot water set point may be about 120° F. and the warm water temperature set point may be less than 120° F. and greater than, for example, about 50° F., about 60° F., about 70° F., about 80° F., about 85° F., about 90° F., about 95° F., about 100° F., or about 110° F.

By reducing the volume of hot water stored the stand-by energy loss may be reduced. As shown in FIG. 2, the water from the first and second tanks may be supplied to mixing valve 114 and mixed together or mixed with cold water to achieve a target temperature before discharging as the blended water and supplying it to a fixture, thereby reducing pipe loss. Mixing valve 114 may be configured to blend any combination of cold, warm, and hot water, the percentage of each depending on the combination, which may vary from 0% to 100%.

SWHS 210 may be configured such that additional parameters are set. For example, SWHS 210 may be configured such that the percentage of water stored at the set-point temperature may be set and the temperature of the water (i.e., warm water) that is stored below the set-point (e.g., the warm water) may be set. The ratio of first tank 201 and second tank 202 may vary depending on the embodiment of SWHS 210. For example, first tank 201 may be twice the size of second tank 202 or first tank 201 and second tank 202 may be of equal size. Where first tank 201 is twice the size of second tank 202, the percentage of warm water may be set to, for example, 0%, 33%, and 66%. When set to 0%, SWHS 210 may have the same stand-by heat loss as a conventional system. SWHS 210 may be configured such that water in either first tank 201 or second tank 202 is stored at about 120° F. for at least two reasons. First, some fixtures such as a dishwasher always require hot water (e.g., 120° F.). It is contemplated that the hot water temperature should be greater or less than about 120° F. Second, storing water for long time periods at temperatures below 120° F. may create risk of bacterial growth. Therefore, SWHS 210 may periodically swap the tank which is storing the 120° F. water. Controller 400 may be in communication with heating sources 126 and configured to trigger the periodic swapping of the "hot tank."

SWHS 210 like SWHS 110 may enter an initialization period where the hot water flow, cold water flow and duration of every water event in the domestic water system is monitored to generate use profiles. The collection of these events may create an event set E (e.g., use profile), where each element i∈E may be a 6-tuple that represents a different water usage event. Each element i of the vector may contain a hot water flow $fh_i$, cold water flow $fc_i$, duration $dur_i$, median temperature $tmp_i$, pipe lag time lag, for that event, and the fixture ID $F_i$. From this event set, the SWHS 210 may define a target temperature and a target delay for each fixture to minimize energy consumption without exceeding the target miss time mt that was specified with energy saver input 132.

SWHS 210 may be configured to choose the fixture temperatures and delays by using brute force optimization. SWHS 210 may loop through all possible values of: (1) target temperature for each fixture; (2) target delay for each fixture; (3) the percentage of the tank dedicated to warm water storage; and (4) the temperature of the warm water storage. For every combination of these parameters, SWHS 210 may use controller 400 to calculate the expected miss time and energy savings based on the set E of fixture events observed during the initialization period. SWHS 210 may then choose the combination of parameters that gives the largest energy savings with the smallest amount of miss time. The pseudo-code for this algorithm is illustrated in Document A at page 6. The calcMissTime function estimates the total miss time given the parameters and calcEnergySaved estimates the total energy consumption. These two functions are described further below.

To calculate miss time and energy consumption, SWHS 210 may be configured to first estimate the instantaneous water temperature inside first tank 201 and second tank 202 while they are being used. When water is drawn out of first tank 201 or second tank 202, cold water may be introduced in its place, which reduces the temperature of the water inside the respective tank. Heating source 126 may then try to raise the temperature back to the set-point, but the actual temperature will depend on the rate of water usage compared to the power of heating source 126. If the water temperature remains low, it may reduce stand-by heat loss. If the water temperature drops too low, however, it may cause increased miss time. For this reason, storing water at a reduced temperature may increase the risk of miss time even if it is warmer than the water used by most fixtures. Accordingly, it is beneficial to calculate the instantaneous tank temperature in order to estimate both miss time and energy usage.

SWHS 210 may compute the instantaneous water temperature inside the tank $Ttank_{ins}$ for every minute t using the aggregate volume of the hot water used that minute $vol_t$ and the power of the heating element $P_{on}$. The size of the tank may be sz and $T_{tank}$, $T_{hot}$, and $T_{in}$ may be the temperature of the tank, hot water, and cold water, respectively. The instantaneous tank temperature may be calculated based on equations (1), (2), and (3) below:

$$T_{tank_{ins}} = T_{tank_{cur}} - (ReductionRate - RecoveryRate) \quad (1)$$

$$RecoveryRate = \frac{EF * P_{on} * (T_{hot} - T_{in})}{sz \times den \times C_p \times (T_{hot} - T_{in})} \quad (2)$$

$$ReductionRate = \frac{((sz - vol_t) * T_{tank_{cur}} + vol_t * T_{in})}{sz} \quad (3)$$

During the optimization process, SWHS 210 may analyze use profiles from the initialization period to estimate the effect on miss time of a given target temperature $t_F$ and target delay $dl_F$ for a specific fixture. If a user of a fixture, for example, was observed using water at a temperature higher than the target temperature, SWHS 210 may add the entire duration of that event to the temperature penalty $pen_{temp}$. If a user of a fixture is observed to wait for hot water at the fixture, the waiting duration may be added to the lag time penalty $pen_{lag}$. If a user of a fixture is observed to wait long enough to actually get hot water at the fixture, SWHS 210 may add the target delay value to the delay penalty $pen_{delay}$. In other words, the delay penalty may be assessed if it appears that the user actually wanted hot water, and would have waited the extra delay. More specifically, for usage event i, the miss time penalties may be assed as follows:

$$pen_{temp} = \begin{cases} dur_i, & \text{if } tmp_i > t_F \\ 0, & \text{otherwise} \end{cases} \quad (4)$$

$$pen_{lag} = \begin{cases} lag_i, & \text{if } tmp_i < t_F \\ 0, & \text{otherwise} \end{cases} \quad (5)$$

$$pen_{delay} = \begin{cases} \frac{dl_F}{2}, & \text{if } lag_i \neq \emptyset \\ 0, & \text{Otherwise} \end{cases} \quad (6)$$

$$MissTime = \sum_i (pen_{temp} + pen_{lag} + pen_{delay}) \quad (7)$$

SWHS 210 may be configured such that the total miss time for a given fixture is the sum of all three penalties for all events in the event set.

SWHS 210 may compute energy consumption as a sum of heating energy and stand-by energy. The heating energy may depend on the volume of water drawn per day while the stand-by energy may depend on the tank temperature. The instantaneous tank temperature may be used so that the stand-by energy reflects savings due to lower tank temperatures. SWHS 210 may use the energy consumption equations, as follows:

$$Q_{heat} = \frac{vol \times den \times C_p \times (T_{hot} - T_{in})}{EF} \quad (8)$$

$$Q_{stdby} = UA \times (T_{tank} - T_{amb}) \times \left(24 - \frac{Q_{out}}{RE \times P_{on}}\right) \quad (9)$$

$$UA = \frac{\frac{1}{RE} - \frac{1}{EF}}{(T_{tank} - T_{amb}) \times \frac{24}{41094} - \frac{1}{RE \times P_{on}}} \quad (10)$$

Where, $Q_{heat}$, $Q_{out}$ and $Q_{stdby}$ refers to the heating energy, heat content of the water and standby energy respectively, vol is the volume of water drawn per day, den is density of water, $C_p$ is the specific heat of water, $T_{amb}$, is the temperature of the atmosphere, EF, UA, and RE are the different tank coefficients, and $P_{on}$ is the Rate input power.

Figure 3:
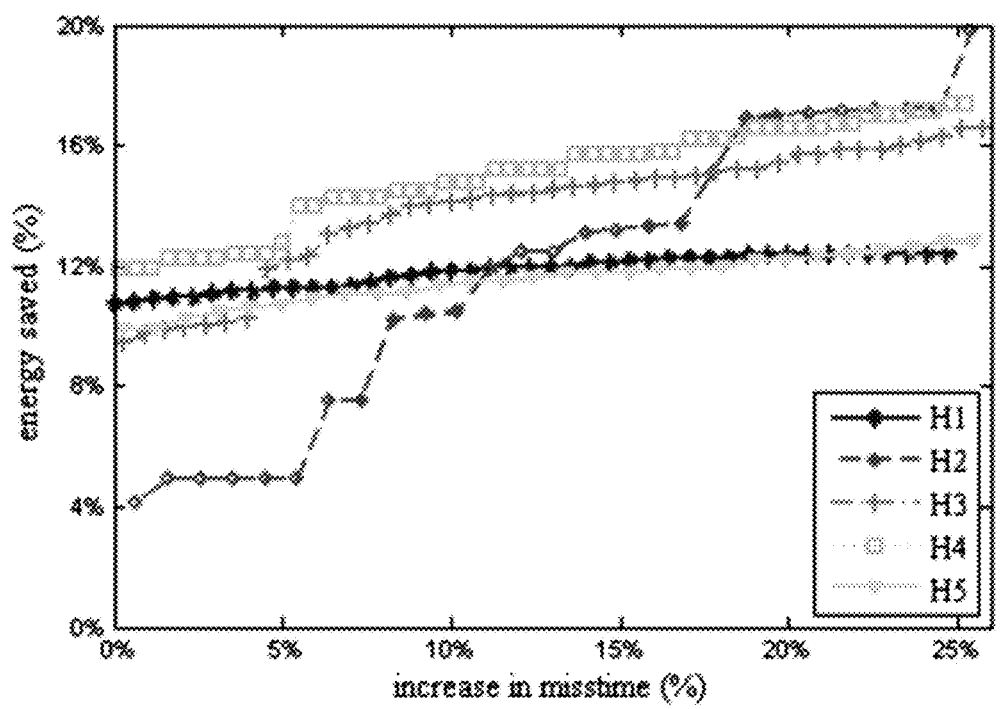
FIG. 3 is a Pareto optimal curve plot of energy savings for an exemplary disclosed hot water heater system.

SWHS 210 was tested in five homes to determine the energy savings. The results of this testing is shown in FIG. 3, which is the Pareto optimal curve of energy savings (i.e., the highest possible energy savings for each value of miss time. FIG. 3 shows the Pareto optimal curves for all five houses tested. SWHS 210 may be configured such that the energy saver input 132 allows a user to dial in to any point on the Pareto optimal curve by choosing a different miss time. "Aggressive" energy savings could produce the values on the right side of the graph, while "conservative" energy savings could produce the values on the left side. As shown in FIG. 3, SWHS 210 may be configured such that even with no additional miss time, energy savings in the 10-12% range may be achieved for four out of the five homes. As shown in FIG. 3, aggressive performance may reduce energy usage by up to 18%. FIG. 3 also illustrates how different houses may have different savings potential. The savings potential may depend on, for example, the piping structure and the hot water usage patterns of the residents. On average, SWHS 210 may reduce total water heating energy by about 8-14%. If adopted widely, this savings would be roughly comparable to the energy used by all passenger and freight trains in the United States combined. For situation where multiple fixtures are used simultaneously, SWHS 210 may be configured to provide water at the highest scheduled temperature among the fixtures that are in use.

Figure 4:
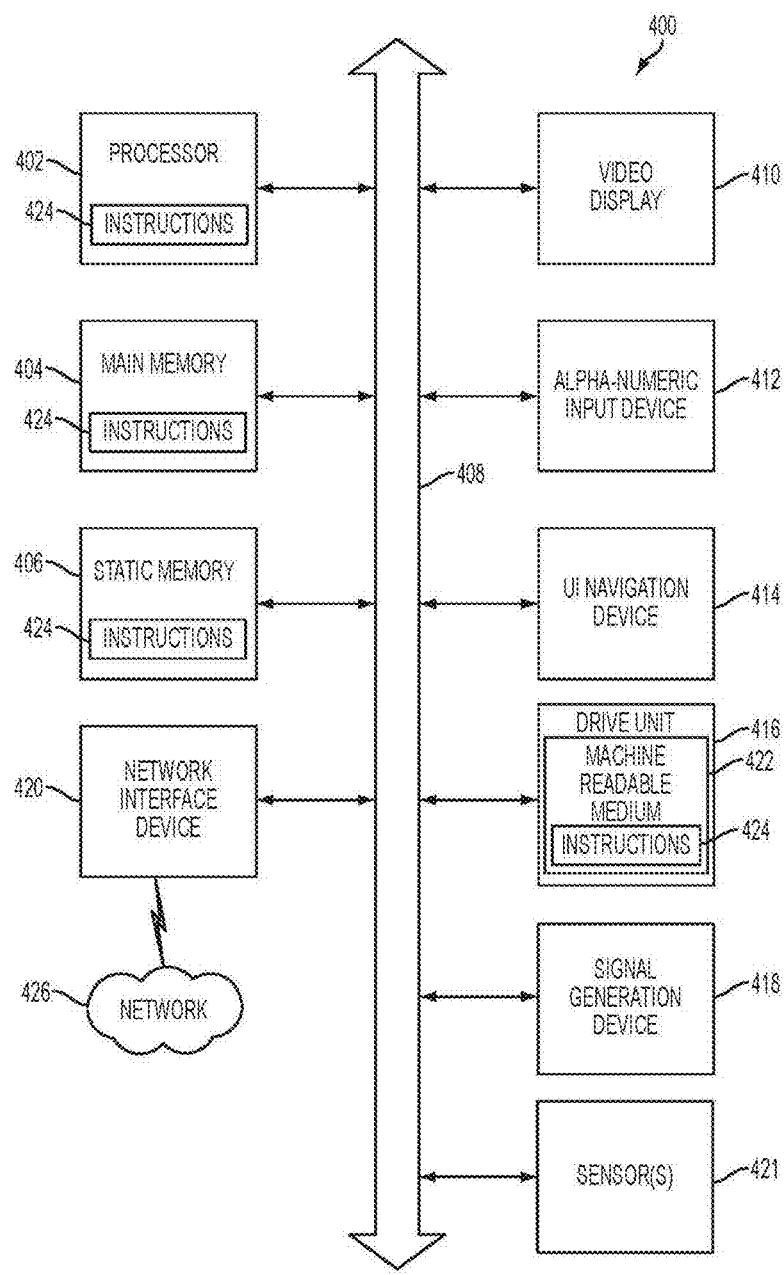
FIG. 4 is a block diagram of an exemplary disclosed controller.

FIG. 4 is a block diagram illustrating an example of controller 400, which may be used in conjunction with the systems and methods described herein. Controller 400 may include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1)

on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or more processors or processor-implemented circuits. The performance of certain of the operations can be distributed among the one or more processors, not only residing within a single controller, but deployed across a number of controllers. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of controllers including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., controller 400) and software architectures that can be deployed in example embodiments.

In an example, the controller 400 can operate as a standalone device or the controller 400 can be connected (e.g., networked) to other controllers.

In a networked deployment, the controller 400 can operate in the capacity of either a server or a client controller in server-client network environments. In an example, controller 400 can act as a peer controller in peer-to-peer (or other distributed) network environments. The controller 400 can be a personal computer (PC), a tablet PC, a set-top box (STB), a Personal Digital Assistant (PDA), a mobile telephone, a web appliance, a network router, switch or bridge, or any controller capable of executing instructions (sequential or otherwise) specifying actions to be taken (e.g., performed) by the controller 400. Further, while only a single controller 400 is illustrated, the term "controller" shall also be taken to include any collection of controllers that individually or jointly execute a set (or multiple sets) of instructions to perform any one or more of the methodologies discussed herein.

Example controller (e.g., computer system) 400 can include a processor 402 (e.g., a central processing unit (CPU), a graphics processing unit (GPU) or both), a main memory 404 and a static memory 406, some or all of which can communicate with each other via a bus 408. Controller 400 can further include a display unit 410, an alphanumeric input device 412 (e.g., a keyboard), and a user interface (UI) navigation device 411 (e.g., a mouse). In an example, display unit 410, input device 417 and UI navigation device 414 can be a touch screen display. Controller 400 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor.

Storage device 416 can include a controller readable medium 422 on which is stored one or more sets of data structures or instructions 424 (e.g., software) embodying or utilized by any one or more of the methodologies or functions described herein. Instructions 424 can also reside, completely or at least partially, within main memory 404, within static memory 406, or within processor 402 during execution thereof by controller 400. In an example, one or any combination of processor 402, main memory 404, static memory 406, or storage device 416 can constitute machine readable media.

While machine readable medium 422 is illustrated as a single medium, the term "machine readable medium" can include a single medium or multiple media (e.g., a centralized or distributed database, and/or associated caches and servers) that can be configured to store the one or more instructions 424. The term "machine readable medium" can also be taken to include any tangible medium that is capable of storing, encoding, or carrying instructions for execution by the controller and that cause the controller to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Instructions 424 can further be transmitted or received over a communications network 426 using a transmission medium via network interface device 420 utilizing any one of a number of transfer protocols (e.g., frame relay, IP, TCP, UDP, HTTP, etc.). Exemplary communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding, or carrying instructions for execution by the controller, and includes digital or analog communications signals or other intangible medium to facilitate communication of such software.

Accordingly, an embodiment of the present disclosure provides, but is not limited thereto, a system, method, and computer readable medium for sensors, algorithms, and controllers that reduce water heating energy at lower cost than conventional equipment upgrades. SWHS 110 and 210 may select a typical water temperature for each fixture based on a usage profile It will be apparent to those skilled in the art that various modifications and variations can be made to the hot water heater system described herein. Other embodiments will be apparent to those skilled in the art from consideration of the specification and practice of the disclosed hot water heater system. It is intended that the specification and examples be considered as exemplary only, with a true scope being indicated by the following claims and their equivalents.

Documents A (Anindya Prodhan and Kamin Whitehouse. "A Smarter Water Heater to Cool Down Your Energy Bill". Submitted to UbiComp'13 on March 25 but not accepted for publication. Currently under preparation for re-submission.); Document B (Anindya Prodhan and Kamin Whitehouse. "Hot Water DJ: Saving Energy by Pre-mixing Hot Water". The 4th ACM Workshop On Embedded Sensing Systems For Energy-Efficiency In Buildings (BuildSys'12). Toronto, Canada. Nov. 6, 2012. (Also posted at the URL above); and Document C (Anindya Prodhan and Kamin Whitehouse. "Hot Water DJ: Saving Energy by Pre-mixing Hot Water".); filed with U.S. Provisional Application No. 62/005,108 on May 30, 2014 are incorporated by reference as well the patents, applications and publication references listed in Document A, Document B, and Document C.

What is claimed is:

1. A smart water heater system for a domestic water system having a plurality of fixtures, comprising:
  a water tank having:
    a cold water inlet configured to receive cold water from a cold water supply;
    a heat source configured to heat the cold water producing hot water;
    a hot water outlet configured to discharge the hot water from the water tank;
    a mixing valve configured to blend cold water from the cold water supply with the hot water from the hot water outlet to produce blended water, wherein the blended water is directed to the domestic water system;
    a first flow meter configured to measure a flow rate of the blended water from the mixing valve;
    a second flow meter configured to measure a flow rate of cold water supplied to the domestic water system;
    a pressure sensor configured to measure a pressure of the cold water supplied to the water tank; and
    a controller in communication with the mixing valve, the first flow meter, the second flow meter, and the pressure sensor, the controller being configured to:
      determine, using measurements from the first flow meter, the second flow meter, and the pressure sensor, an average water temperature utilized by each fixture over time during an initialization period;

identify, using measurements from the first flow meter, the second flow meter, and the pressure sensor, one or more fixtures being used when the domestic water system is drawing water from the water tank; and adjust the mixing valve such that the blended water is about equal to the average water temperature of an identified fixture when one fixture is being used and to the higher of the average water temperatures utilized by each identified fixture when multiple fixtures are used simultaneously.

2. The smart water heater system of claim 1, wherein the water tank has a first tank and a second tank separate from the first tank, wherein each tank is independently heated and temperature controlled by the heat source.

3. The smart water heater system of claim 2, wherein the controller is configured to heat the first tank to a hot water temperature set point and the second tank is heated to a warm water temperature set point.

4. The smart water heater system of claim 3, wherein the controller is configured to calculate the warm water temperature set point based on use profiles for each fixture.

5. The smart water heater system of claim 3, wherein the water from both the first tank and second tank are directed through the mixing valve before being supplied to the domestic water system.

6. The smart water heater system of claim 3, wherein the controller is configured to switch temperature set points for the first tank and the second tank periodically.

7. The smart water heater system of claim 3, wherein the hot water temperature set point is about 120° F. and the warm water temperature set point is less than 120° F. and greater than 85° F.

8. The smart water heater system of claim 3, wherein the controller is configured to detect when a fixture is turned on and off repeatedly, and when detected, to adjust the mixing valve so a temperature of the blended water supplied to the corresponding fixture is temporarily increased.

9. The hot water heater system of claim 1, wherein the controller is configured to, using measurements from the first flow meter, the second flow meter, and the pressure sensor, determine a probability of a short event based on use profiles of the fixtures and when the probability is greater than a short event threshold set point the controller adjusts the mixing of the cold water and hot water such that no hot water is directed to the domestic water system.

10. The hot water heater system of claim 1, wherein the controller determines a pipe lag for each fixture using measurements from the first flow meter, the second flow meter, and the pressure sensor.

11. The hot water heater system of claim 1, wherein the controller is configured to reduce energy cost by limiting the temperature of the water in the water tank and in the domestic water system.

12. The hot water heater system of claim 2, wherein the controller is configured to reduce energy cost by limiting stand-by heat loss by storing water supplied to either the first tank or the second tank at a lower temperature than the hot water.

13. The hot water heater system of claim 1, wherein the system operates like a traditional hot water heater system initially after installation until after the initialization period.

14. A smart water heater system kit for a water heater system for a domestic water system having a plurality of fixtures, comprising:

a mixing valve configured to blend cold water from the cold water supply with the hot water from the hot water outlet of a water tank to produce blended water, where in the blended water is directed to the domestic water system;

a first flow meter configured to measure a flow rate of the blended water from the mixing valve;

a second flow meter configured to measure a flow rate of cold water supplied to the domestic water system;

a pressure sensor configured to measure a pressure of the cold water supplied to the water tank; and a controller in communication with the mixing valve, the first flow meter, the second flow meter, and the pressure sensor, the controller being configured to:

determine, using measurements from the first flow meter, the second flow meter, and the pressure sensor, an average water temperature utilized be each fixture over time during an initialization period;

identify, using measurements from the first flow meter, the second flow meter, and the pressure sensor, one or more fixtures being used when the domestic water system is drawing water from the water tank; and adjust the mixing valve such that the blended water is about equal to the average water temperature of an identified fixture when one fixture is being used and to the higher of the average water temperatures utilized by each identified fixture when multiple fixtures are used simultaneously.

15. A method of operating a smart water heater system for a domestic water system having a plurality of fixtures, the method comprising:

measuring the pressure of cold water supplied to a hot water tank of the system from a cold water supply during operation;

heating the cold water supplied to the hot water tank to produce hot water;

mixing cold water from the cold water supply with hot water from the hot water tank to produce blended water, where in the blended water is directed to the domestic water system;

measuring a flow rate of the blended water supplied to the domestic water system;

measuring a flow rate of the cold water supplied to the domestic water system from the cold water supply; and operating a controller, wherein operating the controller includes:

identifying, using the measured pressure of cold water, flow rate of the blended water, and flow rate of the cold water, which fixture is being used when the domestic water system is drawing water from the hot water tank;

determining, using the measured pressure of cold water, flow rate of the blended water, and flow rate of the cold water, an average water temperature utilized by each fixture; and adjusting a mixing valve such that the blended water is about equal to the average water temperature of an identified fixture when one fixture is being used and to the higher of the average water temperatures utilized by each identified fixture when multiple fixtures are used simultaneously.

16. The method of claim 15, wherein the controller determines a probability of a short event and when the probability is greater than a short event threshold set point the controller adjusts the mixing of the cold water and hot water such that no hot water is directed to the domestic water system.

17. The method of claim 15, wherein the controller determines a pipe lag for each fixture.

18. The method of claim 15, wherein the hot water heater system includes a hot water heater having a first tank and a second tank separate from the first tank, wherein each tank is independently heated and temperature controlled by the heat source and the controller is configured to heat the first tank to a hot temperature set point and the second tank is heat to a warm temperature set point.

19. The method of claim 18, wherein the controller calculates the warm temperature set point based on use profiles for each fixture.

* * * * *